US006815491B2

(12) United States Patent
Adedeji et al.

(10) Patent No.: US 6,815,491 B2
(45) Date of Patent: Nov. 9, 2004

(54) REINFORCED THERMOPLASTIC COMPOSITION AND ARTICLES DERIVED THEREFROM

(75) Inventors: Adeyinka Adedeji, Albany, NY (US); Thomas J. Hartle, Delmar, NY (US); John C. Haylock, Schenectady, NY (US)

(73) Assignee: General Electric, Pittfield, MA (US)

( * ) Notice: Subject to any disclaimer, the term of this patent is extended or adjusted under 35 U.S.C. 154(b) by 0 days.

(21) Appl. No.: 09/682,920

(22) Filed: Nov. 1, 2001

(65) Prior Publication Data

US 2002/0165317 A1 Nov. 7, 2002

Related U.S. Application Data

(60) Provisional application No. 60/258,835, filed on Dec. 28, 2000.

(51) Int. Cl.$^7$ .............. C08J 3/00; C08K 3/00; C08L 51/00

(52) U.S. Cl. ............ 524/504; 525/505; 525/508; 525/515; 525/517; 525/525; 525/528; 525/529

(58) Field of Search .................. 524/504, 505, 524/508, 515, 517, 525, 528, 529; 525/68, 69, 99

(56) References Cited

U.S. PATENT DOCUMENTS

| 4,239,673 | A | | 12/1980 | Lee, Jr. |
|---|---|---|---|---|
| 4,242,263 | A | | 12/1980 | Lee, Jr. |
| 4,299,757 | A | | 11/1981 | Kuribayashi et al. |
| 4,383,082 | A | | 5/1983 | Lee, Jr. |
| 4,460,743 | A | | 7/1984 | Abe et al. |
| 4,480,057 | A | * | 10/1984 | Sano .............. 523/206 |
| 4,559,262 | A | | 12/1985 | Cogswell et al. |
| 4,565,684 | A | | 1/1986 | Tibbetts et al. |
| 4,569,923 | A | | 2/1986 | Knudson, Jr. et al. |
| 4,572,813 | A | | 2/1986 | Arakawa |
| 4,663,230 | A | | 5/1987 | Tennent |
| 4,664,842 | A | | 5/1987 | Knudson, Jr. et al. |
| 4,713,416 | A | | 12/1987 | Del Giudice et al. |
| 4,764,559 | A | | 8/1988 | Yamauchi et al. |
| 4,772,657 | A | | 9/1988 | Akiyama et al. |
| 4,816,289 | A | | 3/1989 | Komatsu et al. |
| 4,863,997 | A | | 9/1989 | Shibuya et al. |
| 4,876,078 | A | | 10/1989 | Arakawa et al. |
| 4,892,904 | A | | 1/1990 | Ting |
| 4,962,148 | A | | 10/1990 | Orikasa et al. |
| 4,985,495 | A | | 1/1991 | Nishio et al. |
| 4,990,558 | A | | 2/1991 | DeNicola, Jr. et al. |
| 4,994,508 | A | | 2/1991 | Shiraki et al. |
| 5,024,818 | A | | 6/1991 | Tibbetts et al. |
| 5,061,753 | A | | 10/1991 | Maruyama et al. |
| 5,071,911 | A | | 12/1991 | Furuta et al. |
| 5,071,912 | A | | 12/1991 | Furuta et al. |
| 5,075,376 | A | | 12/1991 | Furuta et al. |
| 5,079,295 | A | | 1/1992 | Furuta et al. |
| 5,081,187 | A | | 1/1992 | Maruyama et al. |
| 5,086,112 | A | | 2/1992 | Togo et al. |
| 5,106,696 | A | | 4/1992 | Chundury et al. |
| 5,110,501 | A | | 5/1992 | Knudson, Jr. et al. |
| 5,124,410 | A | | 6/1992 | Campbell |
| 5,132,363 | A | | 7/1992 | Furuta et al. |
| 5,149,740 | A | | 9/1992 | Maruyama et al. |
| 5,159,004 | A | | 10/1992 | Furuta et al. |
| 5,160,454 | A | | 11/1992 | Knudson, Jr. et al. |
| 5,162,433 | A | | 11/1992 | Nishio et al. |
| 5,162,435 | A | | 11/1992 | Shibuya et al. |
| 5,162,440 | A | | 11/1992 | Akkapeddi et al. |
| 5,165,909 | A | | 11/1992 | Tennent et al. |
| 5,166,264 | A | | 11/1992 | Lee, Jr. et al. |
| 5,182,151 | A | | 1/1993 | Furuta et al. |
| 5,191,024 | A | | 3/1993 | Shibata et al. |
| 5,206,281 | A | | 4/1993 | Furuta |
| 5,262,477 | A | | 11/1993 | Kasai et al. |
| 5,268,425 | A | | 12/1993 | Furuta et al. |
| 5,272,208 | A | | 12/1993 | Shiraki et al. |
| 5,272,209 | A | | 12/1993 | Shiraki et al. |
| 5,278,220 | A | | 1/1994 | Vermeire et al. |
| 5,286,791 | A | | 2/1994 | DeNicola, Jr. et al. |
| 5,290,856 | A | | 3/1994 | Okamoto et al. |
| 5,296,540 | A | | 3/1994 | Akiyama et al. |
| 5,304,593 | A | | 4/1994 | Nishio et al. |
| 5,321,081 | A | | 6/1994 | Chundury et al. |
| 5,369,173 | A | | 11/1994 | Furuta |
| 5,370,813 | A | | 12/1994 | DeNicola, Jr. et al. |
| 5,397,822 | A | | 3/1995 | Lee, Jr. |
| 5,405,902 | A | | 4/1995 | Nishio et al. |
| 5,418,287 | A | | 5/1995 | Tanaka et al. |

(List continued on next page.)

FOREIGN PATENT DOCUMENTS

| EP | 0 326 895 A2 | 1/1989 |
|---|---|---|
| EP | 412787 A1 | 2/1991 |
| EP | 0 765 914 A1 | 5/1995 |
| EP | 1 029 876 | 9/1999 |
| GB | 1 559 262 | 12/1977 |
| JP | 63-113047 | 5/1988 |
| JP | 63-113049 | 5/1988 |

(List continued on next page.)

OTHER PUBLICATIONS

P. C. LeBaron, Z. Wang, and T. J. Pinnavaia, Applied Clay Science (1999), vol. 15, pp. 11–29."Polymer–layered silicate nanocomposites: an overview".

Tuftec® H1043 Technical, Dec. 16, 1999, Asahi Chemical Industry Co., Ltd., pp. 1–5.

TUFTEC ® P–Series High Performance Thermoplastic Elastomer, pp. 1–2. <http: www.asahi–kasei.co.jp/plastic/technical/br/p–series.htm>.

(List continued on next page.)

*Primary Examiner*—Jeffrey Mullis

(57) ABSTRACT

A reinforced thermoplastic composition includes a poly(arylene ether), a poly(alkenyl aromatic) compound, a polyolefin, a hydrogenated block copolymer with a high alkenyl aromatic content, a polyolefin-graft-cyclic anhydride copolymer, and a reinforcing filler. The composition exhibits high stiffness while maintaining high impact strength.

46 Claims, No Drawings

U.S. PATENT DOCUMENTS

| | | | |
|---|---|---|---|
| 5,424,360 | A | 6/1995 | Nagaoka et al. |
| 5,428,091 | A | 6/1995 | Abe et al. |
| 5,461,111 | A | 10/1995 | Modic et al. |
| 5,473,015 | A | 12/1995 | DeNicola, Jr. et al. |
| 5,494,962 | A | 2/1996 | Gauthy et al. |
| 5,530,052 | A | 6/1996 | Takekoshi et al. |
| 5,589,152 | A | 12/1996 | Tennent et al. |
| 5,591,382 | A | 1/1997 | Nahass et al. |
| 5,648,424 | A | 7/1997 | Miwa et al. |
| 5,686,528 | A | 11/1997 | Wills et al. |
| 5,705,556 | A | 1/1998 | Djiauw et al. |
| 5,773,502 | A | 6/1998 | Takekoshi et al. |
| 5,777,028 | A | 7/1998 | Okada et al. |
| 5,780,376 | A | 7/1998 | Gonzales et al. |
| 5,902,850 | A | 5/1999 | Chino et al. |
| 5,998,029 | A | 12/1999 | Adzima et al. |
| 6,005,050 | A | 12/1999 | Okada et al. |
| 6,013,726 | A | 1/2000 | Nakano et al. |
| 6,031,049 | A | 2/2000 | Chino et al. |
| 6,036,765 | A | 3/2000 | Farrow et al. |
| 6,045,883 | A | 4/2000 | Akiyama et al. |
| 6,057,401 | A | 5/2000 | Modic |
| 6,228,903 | B1 | 5/2001 | Beall et al. |
| 6,258,453 | B1 | 7/2001 | Montsinger |
| 6,258,881 | B1 | 7/2001 | Moritomi |
| 6,262,162 | B1 | 7/2001 | Lan et al. |
| 6,300,417 | B1 | 10/2001 | Sue et al. |
| 6,509,412 | B1 | 1/2003 | Hall |
| 2002/0023845 | A1 | 2/2002 | Ding et al. |
| 2003/0181587 | A1 | 9/2003 | Sasagawa et al. |

FOREIGN PATENT DOCUMENTS

| | | |
|---|---|---|
| JP | 63-113050 | 5/1988 |
| JP | 01-098647 | 4/1989 |
| JP | 03-259941 | 10/1991 |
| JP | 04-007357 | 1/1992 |
| JP | 04-028739 | 1/1992 |
| JP | 04-028740 | 1/1992 |
| JP | 04-279697 | 10/1992 |
| JP | 04-293942 | 10/1992 |
| JP | 05-070679 | 3/1993 |
| JP | 05-295184 | 11/1993 |
| JP | 06-009828 | 1/1994 |
| JP | 06-016924 | 1/1994 |
| JP | 06-057130 | 3/1994 |
| JP | 06-136202 | 5/1994 |
| JP | 07-003083 | 1/1995 |
| JP | 07-304908 | 11/1995 |
| JP | 09-316322 | 12/1997 |
| JP | 11-060836 | 3/1999 |
| JP | 2000-143891 | 5/2000 |
| JP | 2003277555 A | 10/2003 |
| WO | WO 90/05759 | 5/1990 |
| WO | WO 91/05016 | 4/1991 |

OTHER PUBLICATIONS

M. K. Akkapeddi and B. VanBuskirk, Adv. Polym. Technol. (1992), vol. 11, No. 4, pp. 263–275.

G.–X. Wei, H.–J. Sue, J. Chu, C. Huang, K. Gong, "Morphology and Mechanical Property of Poly(phenylene oxide) Modified Polypropylene Blends", ANTEC '99, vol. III, New York City, 2nd–6th May 1999, pp. 3443–3447.

Chemical Abstracts Record for JP 03181555.

Chemical Abstracts Record for JP 03185058.

Chemical Abstracts Record for JP 03231962.

Chemical Abstracts Record for JP 04183748.

Chemical Abstracts Record for JP 07165998.

Chemical Abstracts Record for JP 07166026.

U.S. patent application Ser. No. 09/682,919, Adedeji et al., filed Nov. 1, 2001.

U.S. patent application Ser. No. 09/682,921, Adedeji et al., filed Nov. 1, 2001.

U.S. patent application Ser. No. 09/682,923, Adedeji et al., filed Nov. 1, 2001.

U.S. patent application Ser. No. 09/682,926, Adedeji et al., filed Nov. 1, 2001.

U.S. patent application Ser. No. 09/682,928, Adedeji et al., filed Nov. 1, 2001.

U.S. patent application Ser. No. 09/682,929, Adedeji et al., filed Nov. 1, 2001.

U.S. patent application Ser. No. 09/683,766, Adedeji et al., filed Feb. 12, 2002.

U.S. patent application Ser. No. 10/063,336, Adedeji et al.

Derwent Abstract for JP 58–93730.

JP 06057008. Publication Date of Jan. 3, 1994. Abstract Only. 1 page.

Chemical Abstracts for JP 2003277555 JP 2003277555; A2; 20031002.

* cited by examiner

REINFORCED THERMOPLASTIC COMPOSITION AND ARTICLES DERIVED THEREFROM

CROSS REFERENCE TO RELATED APPLICATIONS

This application claims the benefit of U.S. Provisional Application Ser. No. 60/258,835, filed Dec. 28, 2000.

BACKGROUND OF INVENTION

Compositions comprising poly(arylene ether)s and polyolefins are known in the art, and compositions further comprising a variety of impact modifiers and compatibilizing agents have been described.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof. Use of inorganic fillers, such as glass fiber, potassium titanate whiskers, talc, and precipitated calcium carbonate, is described.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene that contains 45–80 weight percent of a repeating unit derived from the alkenyl aromatic compound. Addition of fillers, such as glass fiber, wollastonite, potassium titanate whiskers, mica, talc, and calcium carbonate, is described.

U.S. Pat. No. 4,892,904 to Ting generally describes compositions comprising (a) a polyphenylene ether, (b) a poly(alkenyl aromatic) resin, (c) a polyolefin resin, (d) an alkenyl aromatic copolymer or terpolymer, and (e) a minor amount of fibrous glass.

U.S. Pat. No. 5,071,912 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a). Use of reinforcing agents and inorganic fillers is described.

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer. Use of fillers, such as glass fiber, wollastonite, potassium titanate, whisker, mica, talc, and calcium carbonate, is described.

U.S. Pat. No. 5,206,281 to Furuta et al. generally describes compositions comprising (a) a polyphenylene ether, (b) a propylene polymer modified by grafting with a styrene-based monomer, alone or in combination with a propylene polymer, (c) a rubbery substance, and (d) an inorganic filler having an average particle diameter of 0.05–10 micrometers.

U.S. Pat. No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one $C_3$–$C_{12}$ alpha-olefin, and (ii) at least one chain nonconjugated diene. Use of reinforcing agents, such as glass fibers, mica, talc, precipitated calcium carbonate, silica, wollastonite, and potassium titanate whisker, is described.

U.S. Pat. No. 6,031,049 to Chino et al. generally describes a composition comprising specific amounts of (a) a component composed of syndiotactic polystyrene and a polyolefin, (b) a block or graft styrene-olefin copolymer having a styrene content of 40 to 85% by weight, and (c) a polyphenylene ether. Use of inorganic fillers is described.

European Patent Application No. 412,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b). Use of reinforcing agents, including glass fiber filaments, is described.

The commercial value of the above described compositions has been limited by deficiencies in the balance between stiffness and impact strength, as well as the consistency of various properties from batch to batch and from molded sample to molded sample within the same batch. There remains a need for poly(arylene ether)-polyolefin compositions having improved property balances. In particular, there remains a need for poly(arylene ether)-polyolefin compositions exhibiting improved impact strength at high stiffness. There also remains a need for poly(arylene ether)-polyolefin compositions exhibiting reduced batch-to-batch and sample-to-sample variability in key properties, including stiffness and impact strength.

SUMMARY OF INVENTION

The above described and other drawbacks and disadvantages of the prior art are alleviated by a composition, comprising: a poly(arylene ether); a poly(alkenyl aromatic) resin in an amount of at least about 10 weight percent of the total of the poly(arylene ether) and the poly(alkenyl aromatic) resin; a polyolefin; a hydrogenated block copolymer of an alkenyl aromatic compound and a conjugated diene, wherein the hydrogenated block copolymer has an alkenyl aromatic content of about 40 to about 90 weight percent; a polyolefin-graft-cyclic anhydride copolymer; and a reinforcing filler.

Another embodiment of the invention is a composition, comprising: a poly(arylene ether); a poly(alkenyl aromatic) resin; a polyolefin; a hydrogenated block copolymer of alkenyl aromatic compound and a conjugated diene, wherein the hydrogenated block copolymer has an alkenyl aromatic content of about 40 to about 90 weight percent; an unhydrogenated block copolymer of alkenyl aromatic compound and a conjugated diene; and a reinforcing filler.

Other embodiments, including articles comprising reaction products of the above compositions, are described below.

DETAILED DESCRIPTION

A thermoplastic composition having an excellent balance of stiffness and impact strength, as well as reduced property variability, comprises: a poly(arylene ether); a poly (alkenyl aromatic) resin in an amount of at least about 10 weight percent of the total of the poly(arylene ether) and the poly(alkenyl aromatic) resin; a polyolefin; a hydrogenated block copolymer of an alkenyl aromatic compound and a conjugated diene, wherein the hydrogenated block copolymer has an alkenyl aromatic content of about 40 to about 90 weight percent; a polyolefin-graft-cyclic anhydride copolymer; and a reinforcing filler.

The present inventors have surprisingly discovered that their compositions provide a beneficial and previously unattainable property balance. The compositions also provide a substantial reduction in property variability compared to known compositions. Other embodiments, including articles comprising the composition, are described below.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

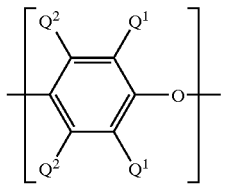

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly (arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 10 to about 55 weight percent, based on the total weight of the composition. Within this range, it may be preferred to use the poly(arylene ether) in an amount of at least about 15 weight percent, more preferably at least about 18 weight percent. It may also be preferred to use the poly(arylene ether) in an amount of up to about 55 weight percent, more preferably up to about 50 weight percent.

The composition further comprises a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

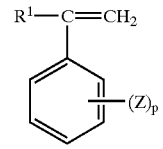

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene. The rubber-modified poly(alkenyl aromatic) resin may comprise about 98 to about 70 weight percent of the homopolymer of an alkenyl aromatic monomer and about 2 to about 30 weight percent of the rubber modifier. Within these ranges it may be preferred to use at least 88 weight percent of the alkenyl aromatic monomer. It may also be preferred to use up to about 94 weight percent of the alkenyl aromatic monomer. It may also be preferred to use at least 6 weight percent of the rubber modifier. It may also be preferred to use up to 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Plastics, and BA 5350 from Chevron.

The composition may comprise the poly(alkenyl aromatic) resin in an amount of about 1 to about 50 weight percent, preferably about 3 to about 50 weight percent, based on the total weight of the composition.

In one embodiment, the amount of poly(alkenyl aromatic) resin may be expressed as a fraction of the total of poly(arylene ether) and poly(alkenyl aromatic) resin. The composition may preferably comprise poly(alkenyl aromatic) resin in an amount of about 10 to about 80 weight percent, based on the combined weight of poly(arylene ether) and poly(alkenyl aromatic) resin. Within this range, it may be preferred to use a poly(alkenyl aromatic) resin amount up to about 70 weight percent, more preferably up to about 65 weight percent. Also within this range, it may be preferred to use a poly(alkenyl aromatic) resin amount of at least about 20 weight percent, more preferably at least about 30 weight percent. When the amount of poly(alkenyl aromatic) resin is less than about 10 weight percent of the total of the poly(arylene ether) and poly(alkenyl aromatic) resin, the composition after molding may be deficient in flexural modulus. When the amount of poly(alkenyl aromatic) resin is greater than about 80 weight percent of the total of the poly(arylene ether) and poly(alkenyl aromatic) resin, the composition after molding may be deficient in heat distortion temperature. The proportions of poly(alkenyl aromatic) resin and poly(arylene ether) may be manipulated to control the glass transition temperature ($T_g$) of the single phase comprising these two components relative to the $T_g$ of the poly(arylene ether) alone, or relative to the melting temperature ($T_m$) of the polyolefin alone. For example, the relative amounts of poly(alkenyl aromatic) resin and poly(arylene ether) may be chosen so that the poly(arylene ether) and the poly(alkenyl aromatic) resin form a single phase having a glass transition temperature at least about 20° C. greater, preferably at least about 30° C. greater, than the glass transition temperature of the poly(alkenyl aromatic) resin alone, which may be, for example, about 100° C. to about 110° C. Also, the relative amounts of poly(alkenyl aromatic) resin and poly(arylene ether) may be chosen so that the poly(arylene ether) and the poly(alkenyl aromatic) resin are present in a single phase having a glass transition temperature up to about 15° C. greater, preferably up to about 10° C. greater, more preferably up to about 1° C. greater, than the $T_m$ of the polyolefin alone. The relative amounts of poly(alkenyl aromatic) resin and poly(arylene ether) may be chosen so that the poly(arylene ether) and the poly(alkenyl aromatic) resin are present in a single phase having a glass transition temperature of about 130° C. to about 180° C.

The composition further comprises a polyolefin. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins may comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The composition may comprise polyolefin in an amount of about 10 to about 60 weight percent, based on the total weight of the composition. Within this range, a polyolefin amount of at least about 15 weight percent may be preferred. Also within this range, a polyolefin amount of up to about 50 weight percent may be preferred, and an amount of up to about 40 weight percent may be more preferred.

The composition comprises a hydrogenated alkenyl aromatic compound/conjugated diene block copolymer having an alkenyl aromatic content of about 40 to about 90 weight percent (hereinafter referred to as the "hydrogenated block copolymer"). The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure having a branched chain.

Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula

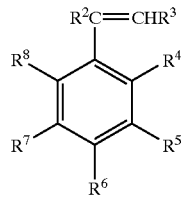

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the hydrogenated block copolymer may be about 40 to about 90 weight percent, based on the total weight of the hydrogenated block copolymer, with the lower limit of the alkenyl aromatic compound content preferably being about 50 weight percent, more preferably about 55 weight percent, and with the upper limit of the alkenyl aromatic compound content preferably being up to about 85 weight percent, more preferably up to about 75 weight percent, yet more preferably up to about 70 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight is preferably at least about 10,000 AMU, more preferably at least about 30,000 AMU, yet more preferably at least about 45,000 AMU. Also within this range, the number average molecular weight is preferably up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 160° C. or having no definite melting point (i.e., having non-crystallinity), as measured according to the above-described technique, are preferred. Within the melting point range of about −40° C. to about 160° C., it may be preferred to use a hydrogenated block copolymer having a melting point of at least about −20° C., more preferably at least about 0° C., yet more preferably at least about 20° C., still more preferably at least about 40° C. Also within this range, it may be preferred to use a hydrogenated block copolymer having a melting point of up to about 140° C., more preferably up to about 110° C., yet more preferably up to about 100° C.

The hydrogenated block copolymer may have any glass transition temperature ($T_g$) ascribed to the hydrogenated conjugated diene polymer chain. From the standpoint of low-temperature impact strength of the resulting resin composition, it preferably has a $T_g$ of up to about −60° C., more preferably up to about −120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

The hydrogenated block copolymer may be synthesized by block polymerization followed by hydrogenation as described, for example, in U.S. Pat. No. 4,863,997 to Shibuya et al. Suitable hydrogenated block copolymers include the styrene-(ethylene-butylene) diblock and styrene-(ethylene-butylene)-styrene triblock copolymers commercially available as, for example, TUFTEC® H1043 sold by Asahi Chemical.

The composition may comprise the hydrogenated block copolymer in an amount of about 1 to about 20 weight percent, preferably about 1 to about 15 weight percent, more preferably about 1 to about 10 weight percent, based on the total weight of the composition.

The composition further comprises a reinforcing filler. Reinforcing fillers may include, for example, inorganic and organic materials, such as fibers, woven fabrics and non-woven fabrics of the E-, NE-, S-, T- and D-type glasses and quartz; carbon fibers, including poly (acrylonitrile) (PAN) fibers, vapor-grown carbon fibers, and especially graphitic vapor-grown carbon fibers having an average diameter of about 3 to about 500 nanometers (see, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), polyimide benzoxazole, poly(phenylene sulfide), polyesters, aromatic polyamides, aromatic polyimides or polyetherimides, acrylic resins, and poly(vinyl alcohol). Fluoropolymers such as polytetrafluoroethylene, may be used. Also included are natural organic fibers known to one skilled in the art, including cotton cloth, hemp cloth, and felt, carbon fiber fabrics, and natural cellulosic fabrics such as Kraft paper, cotton paper, and glass fiber containing paper. Such reinforcing fillers could be in the form of monofilament or multifilament fibers and could be used either alone or in combination with another type of fiber, through, for example, coweaving or core-sheath, side-by-side, orange-type or matrix and fibril constructions or by other methods known to one skilled in the art of fiber manufacture. They may be in the form of, for example, woven fibrous reinforcements, non-woven fibrous reinforcements, or papers.

Preferred reinforcing fillers include glass fibers. Preferred glass fibers may have diameters of about 2 to about 25 micrometers, more preferably about 10 to about 20 micrometers, yet more preferably about 13 to about 18 micrometers. The length of the glass fibers may be about 0.1 to about 20 millimeters, more preferably about 1 to about 10 millimeters, yet more preferably about 2 to about 8 millimeters. Longer glass fibers may also be used, as, for example, in so-called in-line compounding for long fiber filled parts in a one-step process without a pelletization step. Equipment for such in-line compounding is commercially available as, for example, the Husky 3000 kiloNewton (330 ton) molding machine from Husky, Ontario, Canada. Use of long fiber composites for injection molding is also described in U.S. Pat. No. 4,559,262 to Cogswell et al. and U.S. Pat. No. 6,258,453 B1 to Montsinger. Glass fibers comprising a sizing to increase their compatibility with the polyolefin or the poly(arylene ether) are particularly preferred. Suitable sizings are described, for example, in U.S. Pat. No. 5,998,029 to Adzima et al. Suitable glass fibers are commercially available as, for example, product numbers 147A-14P (14 micrometer diameter) and 147A-17P (17 micrometer diameter) from Owens Corning.

Preferred reinforcing fillers further include talc. There are no particular limitations on the physical characteristics of the talc. Preferred talcs may have an average particle size of about 0.5 to about 25 micrometers. Within this range, it may be preferred to use a talc having an average particle size up to about 10 micrometers, more preferably up to about 5 micrometers. For some uses of the composition, it may be preferred to employ a talc that is F.D.A. compliant (i.e., compliant with U.S. Food and Drug Administration regulations). Suitable talcs include, for example, the F.D.A. compliant talc having an average particle size of about 3.2 micrometers sold as CIMPACT® 610(C) from Luzenac.

The compatibility of the reinforcing filler and the polyolefin may be improved not just with sizings on the surface of the reinforcing fillers, but also by adding to the composition a graft copolymer comprising a polyolefin backbone and polar grafts formed from one or more cyclic anhydrides. Such materials include graft copolymers of polyolefins (as defined above for the polyolefin component of the composition) and $C_4$–$C_{12}$ cyclic anhydrides, such as, for example, those available from ExxonMobil under the tradename EXXELOR® and from DuPont under the tradename FUSABOND®. Examples of suitable polyolefin-graft-cyclic anhydride copolymers are the polypropylene-graft-maleic anhydride materials supplied by ExxonMobil as EXXELOR® PO1020 and by DuPont as FUSABOND® M613-05. Suitable amounts of such materials may be readily determined and are generally about 0.1 to about 10 weight percent, based on the total weight of the composition. Within this range, a polyolefin-graft-cyclic anhydride copolymer amount of at least about 0.5 weight percent may be preferred. Also within this range, a polyolefin-graft-cyclic anhydride copolymer amount of up to about 5 weight percent may be preferred.

Preferred reinforcing fillers further include organoclays. As used herein, an organoclay is a layered silicate clay, derived from layered minerals, in which organic structures have been chemically incorporated. Illustrative examples of organic structures are trimethyldodecylammonium ion and N,N'-didodecylimidazolium ion. Since the surfaces of clay layers, which have a lattice-like arrangement, are electrically charged, they are capable of binding organic ions. There is no limitation with respect to the layered minerals employed in this invention other than that they are capable of undergoing an ion exchange with the organic ions. Preferred organoclays include layered minerals that have undergone cation exchange with organocations and/or onium compounds. Illustrative of such layered minerals are the kaolinite group, the montmorillonite group, and the illite group which can include hydromicas, phengite, brammallite, glaucomite, celadonite and the like. Preferred layered minerals include those often referred to as 2:1 layered silicate minerals like muscovite, vermiculite, saponite, hectorite and montmorillonite, wherein montmorillonite is often preferred. The layered minerals described above may be synthetically produced. However, most often they are naturally occurring and commercially available. Organoclays and their preparation are described, for example, in U.S. Pat. Nos. 4,569,923, 4,664,842, 5,110,501, and 5,160,454 to Knudson, Jr. et al.; U.S. Pat. Nos. 5,530,052 and 5,773,502 to Takekoshi et al.; U.S. Pat. No. 5,780,376 to Gonzales et al.; U.S. Pat. No. 6,036,765 to Farrow et al.; U.S. Pat. No. 6,228,903 B1 to Beall et al.; and U.S. Pat. No. 6,262,162 B1 to Lan et al.

The composition comprises the reinforcing filler in an amount of about 1 to about 50 weight percent, preferably about 5 to about 50 weight percent, based on the total weight of the composition. When the reinforcing filler is an organoclay, it may be preferred to use it in an amount of at least about 5 weight percent, more preferably at least about 10 weight percent. Also when the reinforcing filler is an organoclay, it may be preferred to use it in an amount of up to about 45 weight percent, more preferably up to about 50 weight percent.

The composition may, optionally, further comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the polymerized ethylene content is up to about 10 weight percent, preferably up to about 4 weight percent, and when the olefin is a $C_4$–$C_{10}$ olefin, the polymerized content of the $C_4$–$C_{10}$ olefin is up to about 20 weight percent, preferably up to about 16 weight percent; (c) a random terpolymer of propylene and at least two olefins selected from the group consisting of ethylene and $C_4$–$C_{10}$ alpha-olefins, provided that the polymerized $C_4$–$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$–$C_{10}$ olefins include the linear and branched $C_4$–$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent, of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present, the polypropylene-polystyrene graft copolymer may be used in an amount of about 0.5 to about 20 weight percent, based on the total weight of the composition. Within this range, it may be preferred to use at least about 1.0 weight percent of the polypropylene-polystyrene graft copolymer. Also within this range, it may also be preferred to use up to about 15 weight percent, more preferably up to about 10 weight percent, yet more preferably up to about 8 weight percent, of the polypropylene-polystyrene graft copolymer.

The composition may, optionally, further comprise an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent ethylene and about 75 to about 25 weight percent alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butylene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polyolefins such as, for example, the ethylene-propylene rubber pre-dispersed in polypropylene sold as product numbers Profax 7624 and Profax 8623 from Basell, and the ethylene-butylene rubber pre-dispersed in polypropylene sold as Catalioy K021P from Basell.

When present, the ethylene/alpha-olefin elastomeric copolymer may be used in an amount of about 0.5 to about 25 weight percent, based on the total weight of the composition. Within this range, it may be preferred to use at least about 1 weight percent, more preferably at least about 3 weight percent, of the ethylene/alpha-olefin elastomeric copolymer. Also within this range, it may be preferred to use up to about 20 weight percent, more preferably up to about 15 weight percent, of the ethylene/alpha-olefin elastomeric copolymer.

Alternatively, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 30 weight percent, preferably about 3 to about 30 weight percent, based on the combined weight of polyolefin and ethylene/alpha-olefin elastomeric copolymer.

The composition may, optionally, further comprise an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 50 percent (A) blocks.

Particularly preferred unhydrogenated block copolymers include styrene-butadiene diblock copolymers and styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical). Suitable unhydrogenated block copolymers further include the styrene-butadiene radial teleblock copolymers available as, for example, K-RESIN® KR01, KR03, KR05, and KR10 sold by Chevron Phillips Chemical Company.

When present, the unhydrogenated block copolymers may be used at about 0.5 to about 20 weight percent, based on the total weight of the composition. Within this range, it may be preferred to use at least about 1 weight percent, more preferably at least about 2 weight percent, of the unhydrogenated block copolymers. Also within this range, it may be preferred to use up to about 15 weight percent, preferably up to about 10 weight percent, of the unhydrogenated block copolymers.

The composition may, optionally, further comprise a hydrogenated block copolymer of an alkenyl aromatic compound and a conjugated diene, wherein the hydrogenated block copolymer has an alkenyl aromatic content of about 10 to less than 40 weight percent. For this component, the alkenyl aromatic compound and the conjugated diene compound are the same as those defined above for the hydrogenated block copolymer having an alkenyl aromatic content of about 40 to about 90 weight percent. Such materials are commercially available as, for example, KRATON® G1650 and G1652 from Kraton Polymers. When present, the hydrogenated block copolymer having an alkenyl aromatic content of about 10 to less than 40 weight percent may be used at about 1 weight percent to about 20 weight percent, based on the total weight of the composition.

In addition to the components described above, the composition may comprise one or more additives known in the art. Such additives may include, for example, stabilizers, mold release agents, processing aids, flame retardants, drip retardants, nucleating agents, UV blockers, dyes, pigments, particulate fillers (i.e., fillers having an aspect ratio less than about 3), antioxidants, anti-static agents, blowing agents, and the like. Such additives are well known in the art and appropriate amounts may be readily determined.

In one embodiment, the composition comprises: a poly(arylene ether); a poly(alkenyl aromatic) resin; a polyolefin; a hydrogenated block copolymer of an alkenyl aromatic compound and a conjugated diene, wherein the hydrogenated block copolymer has an alkenyl aromatic content of about 40 to about 90 weight percent; a polypropylene-polystyrene graft copolymer or an unhydrogenated block copolymer of an alkenyl aromatic compound and a conjugated diene; an a reinforcing filler.

In another embodiment, the composition comprises: about 10 to about 55 weight percent of a poly(arylene ether); about 1 to about 50 weight percent of a poly(alkenyl aromatic) resin; wherein the amount of poly(alkenyl aromatic) resin is at least about 10 weight percent of the total of the poly(arylene ether) and the poly(alkenyl aromatic) resin; about 10 to about 60 weight percent of a polyolefin; about 1 to about 20 weight percent of a hydrogenated block copolymer of alkenyl aromatic compound and a conjugated diene having an alkenyl aromatic content of about 40 to about 90 weight percent; about 0.1 to about 10 weight percent of a polyolefin-graft-cyclic anhydride copolymer; and about 1 to about 50 weight percent of a reinforcing filler; wherein all weight percents are based on the total weight of the composition.

In another embodiment, the composition comprises: about 10 to about 55 weight percent of a poly(arylene ether); about 1 to about 50 weight percent of a poly(alkenyl aromatic) resin; about 10 to about 60 weight percent of a polyolefin; about 1 to about 20 weight percent of a hydrogenated block copolymer of alkenyl aromatic compound and a conjugated diene having an alkenyl aromatic content of about 40 to about 90 weight percent; about 0.5 to about 20 weight percent of a polypropylene-polystyrene graft copolymer or an unhydrogenated block copolymer of an alkenyl aromatic compound and a conjugated diene; and about 1 to about 50 weight percent of a reinforcing filler; wherein all weight percents are based on the total weight of the composition.

In another embodiment, the thermoplastic composition comprises: about 10 to about 55 weight percent of a poly(arylene ether); about 1 to about 50 weight percent of a poly(alkenyl aromatic) resin; about 10 to about 60 weight percent of a polyolefin; about 1 to about 20 weight percent of a hydrogenated block copolymer of alkenyl aromatic compound and a conjugated diene having an alkenyl aromatic content of about 40 to about 90 weight percent; about 1 to about 50 weight percent of a reinforcing filler; about 0.5 to about 20 weight percent of a polypropylene-polystyrene graft copolymer or an unhydrogenated block copolymer of an alkenyl aromatic compound and a conjugated diene; and about 0.5 to about 25 weight percent of an ethylene/alpha-olefin elastomeric copolymer; wherein all weight percents are based on the total weight of the composition.

In another embodiment, the thermoplastic composition comprises the reaction product of: a poly(arylene ether); a poly(alkenyl aromatic) resin in an amount of at least about 10 weight percent of the total of the poly(arylene ether) and the poly(alkenyl aromatic) resin; a polyolefin; a hydrogenated block copolymer of an alkenyl aromatic compound and a conjugated diene, wherein the hydrogenated block copolymer has an alkenyl aromatic content of about 40 to about 90 weight percent; a polyolefin-graft-cyclic anhydride copolymer; and a reinforcing filler.

As the composition is defined as comprising multiple components, it will be understood that each component is chemically distinct, particularly in the instance that a single chemical compound may satisfy the definition of more than one component.

The preparation of the compositions of the present invention is normally achieved by merely blending the ingredients under conditions for the formation of an intimate blend. Such conditions often include mixing in single- or twin-screw type extruders or similar mixing devices that can apply a shear to the components.

Preferred blending methods are described in detail in the co-filed application U.S. Ser. No. 09/682,929, which is incorporated herein in its entirety. In a preferred embodiment, the components are blended in an extruder having at least two addition ports, with at least about 50%, preferably at least about 75%, more preferably all of the poly(arylene ether) added upstream, and at least about 50%, preferably at least about 75%, yet more preferably 100%, of the polyolefin added downstream, and at least about 50%, preferably at least about 75%, more preferably all, df the glass fibers added downstream. In another preferred embodiment, the components are blended using at least two mixing stages, comprising upstream mixing and downstream mixing, wherein the upstream mixing is high-energy mixing characterized by at least two mixing elements and/or a mixing section not less than about 1 inch in length. Downstream mixing may be either high-energy mixing as described above or low-energy mixing, depending on the composition and desired properties of the composition.

The composition is suitable for the formation of articles or components of articles using a variety of molding techniques such as, for example, injection molding, blow molding, extrusion, sheet extrusion, film extrusion, profile extrusion, pultrusion, compression molding, thermoforming, pressure forming, hydroforming, vacuum forming, foam molding, and the like. When articles are formed from the composition using blow molding, density reductions as high as about 95% may be achieved.

The composition exhibits improved property balances. In particular, the composition exhibits an improved balance between stiffness and impact strength. For example the composition may exhibit a flexural modulus at 23° C., measured according to ASTM D790, of at least about 300, preferably at least about 350, kilopounds per square inch (kpsi). The composition may exhibit an Izod Notched Impact Strength measured at 23° C. according to ASTM D256 of at least about 1 foot-pound per inch (ft-lb/in), preferably at least about 1.5 ft-lb/in, more preferably at least about 2 ft-lb/in. The composition may exhibit a heat distortion temperature (HDT), measured at 66 psi according to ASTM D648 of at least about 280° F., preferably at least about 290° F., more preferably at least about 300° F., and an HDT at 264 psi of at least about 200° F., preferably at least about 220° F., more preferably at least about 240° F. The composition may exhibit a tensile elongation at break measured according to ASTM D638 of at least about 4%, preferably at least about 5%, more preferably at least about 6%.

The composition may exhibit low variability in properties, whether from batch-to-batch, or from sample-to-sample for a given batch. Variability may be calculated in percentage form as 100 times a property's standard deviation divided by the property's mean. The composition may exhibit sample-to-sample (i.e., within batch) variability in Flexural Modulus at 23° C. of less than about 10 percent, preferably less than about 5%, more preferably less than about 3%. The composition may exhibit batch-to-batch variability in Izod Notched Impact Strength measured at 23° C. according to ASTM D256 less than about 15%, preferably less than about 10%, more preferably less than about 5%.

The invention is further illustrated by the following non-limiting examples.

EXAMPLES 1–4

Comparative Examples 1–10

Raw materials used in all example formulations are summarized in Table 1.

Components 1–11 were thoroughly hand mixed in a bag. Unless otherwise specified, all component amounts are expressed in parts by weight. The contents of this bag were then fed through a feeder and entered the extruder at the throat (extruder initial entry point). Components 12–14 were then fed into the extruder downstream (entry points were located after the feed throat, approximately barrel 5 of 10).

Specific formulations of examples and comparative examples are given in Table 2. Samples were extruded using a 30 mm co-rotating twin screw extruder. Blends were melt extruded at 520° F., 450–500 rpm, and 30–55 pounds per hour. Melt from the extruder was forced through a 3-hole die to produce melt strands. These strands were rapidly cooled by passing them through a cold water bath. The cooled strands were chopped into pellets. Pellets were dried in the oven at 200° F. for 2–4 hours.

ASTM parts were molded on a 120 tonne molding machine (manufacturer: Van Dorn) at 100–120° F. mold temp and a 450–550° F. barrel temperature.

Parts were tested according to ASTM methods. Flexural modulus was measured according to ASTM D790. Heat distortion temperatures (HDT) at 64 and 264 psi were measured according to ASTM D648. Izod notched and unnotched impact strengths were measured according to ASTM D256. Dynatup (falling dart) total energy, energy to maximum load, and energy to failure were measured according to ASTM D3763. Tensile elongation at break, tensile strength at break, and tensile strength at yield were measured according to ASTM D638. Where values of mean and standard deviation are given for a property, they represent results for five samples.

Results are presented in Table 2. Compared to samples lacking glass fibers, samples containing glass fibers exhibit high flexural modulus and heat distortion temperature while maintaining good impact strength.

TABLE 1

| No. | Raw Material | Grade | Description | Form | Source |
|---|---|---|---|---|---|
| 1 | PP pellets | PD403 | isotactic propylene polymer, MFI (200 C./2.16 kg) = 1.5 | Pellets | Montell Polyolefin Inc., North America (now BASELL) |
| 2 | EPR | VISTALON ® 878 | Ethylene-propylene copolymer, Melt Index (190 C./21.6 kg) = 6.5 g/10 mins, | Pellets | ExxonMobil Chemical |
| 3 | PP-EPR, HECO-30 | Profax 7624 | Polypropylene with ethylene-propylene rubber (EPR) as heterophasic/pre-dispersed, EPR content = 30 weight % | Pellets | Montell Polyolefin Inc. |
| 4 | PP-g-PS | Interloy P1045H1 | PP with PS polymer graft which contains about 45 pph of total PP-g-PS | pellets | Montell Polyolefin Inc., North America (now BASELL) |
| 5 | PPE | 0.4 IV | poly(2,6-dimethylphenylene ether) | Powder | General Electric Company |
| 6 | xPS | Chevron EB3300 | homopolystyrene, MFR (200 C., 5 kg) = 10.5 g/10 mins | Pellets | Huntsman Chemical |
| 7 | HIPS | GEH 1897 | PS molecular weight of 230,000 g/mol, % butadiene 10.3% of total HIPS | Pellets | General Electric Company |
| 8 | SBS | KRATON ® D1101 | contains about 31% PS | Pellets | Shell Chemical company |
| 9 | lo-S SEBS | KRATON ® G1652 | contains about 28% PS, Mwt = 77,000 g/mol | Pellets | Shell Chemical company |
| 10 | hi-S SEBS | TUFTEC ® H1043 | Contains about 66% PS | Pellets | Asahi Chemical, distributed through Marubeni America Corporation |
| 11 | PP-g-MA | EXXELOR ® PO1020 | polypropylene with about 0.7 wt % poly(maleic anhydride) grafts | Pellets | ExxonMobil |
| 12 | Glass fibers-14 | 147A–14P | Glass fibers, filament diameter = 14 micron, sized for PP matrix, average length = 4 mm | Chopped fibers | Owens Corning |
| 13 | Glass fibers-17 | 147A–17P | Glass fibers, filament diameter = 17 micron, sized for PP matrix, average length = 4 mm | Chopped fibers | Owens Corning |
| 14 | Talc | CIMPACT ® 610 (C) | talc, average particle size = 3.2 microns, minimum Hegman fineness = 5.75, FDA compliant | Powder | Luzenac |

TABLE 2

| | Ex. 1 | Ex. 2 | Ex. 3 | Ex. 4 |
|---|---|---|---|---|
| COMPOSITION | | | | |
| PP-g-PS | 10.00 | 10.00 | 4.33 | 4.63 |
| hi-S SEBS | 10.00 | 5.00 | 2.60 | 10.00 |
| lo-S SEBS | 0.00 | 0.00 | 2.60 | 0.00 |
| PPE | 26.40 | 15.00 | 18.14 | 15.00 |
| HIPS | 0.00 | 0.00 | 0.00 | 0.00 |
| xPS | 6.60 | 22.50 | 12.02 | 3.75 |
| SBS | 15.00 | 6.93 | 5.60 | 4.63 |
| PP pellets | 22.00 | 22.00 | 33.36 | 22.00 |
| EPR | 0.00 | 8.57 | 0.00 | 0.00 |
| Glass Fibers-14 | 10.00 | 10.00 | 21.36 | 40.00 |
| PROPERTIES | | | | |
| Flexural Modulus (psi), mean | 408,700 | 401,800 | 575,800 | 1,199,000 |
| Flex Modulus (psi), stddev | 32,920 | 4,108 | 4,056 | 25,000 |
| Flex Modulus, rel. stddev | 8.1 | 1.0 | 0.7 | 2.1 |
| HDT, 66 psi (° F.) | 295 | 289.8 | 305.2 | 312.8 |
| HDT, 264 psi (° F.) | 257.8 | 219.8 | 268 | 286.7 |
| Izod Notched Impact (ft-lb/in), mean | 2.5 | 2.4 | 2.2 | 2.1 |
| Izod Notched Impact (ft-lb/in), stddev | 0.3 | 0.1 | 0.1 | <0.05 |
| Izod Notched Impact (ft-lb/in), rel. stddev | 12.0 | 4.2 | 4.5 | <2.4 |
| Tensile Elongation at Break (%) | 7.76 | 8.53 | 7.55 | 5.01 |

| | Comp. Ex. 1 | Comp. Ex. 2 | Comp. Ex. 3 | Comp. Ex. 4 | Comp. Ex. 5 |
|---|---|---|---|---|---|
| COMPOSITION | | | | | |
| PP-g-PS | 0.00 | 10.00 | 0.00 | 0.00 | 10.00 |
| hi-S SEBS | 0.00 | 0.00 | 0.00 | 0.00 | 0.00 |
| lo-S SEBS | 0.00 | 0.00 | 0.00 | 0.00 | 0.00 |
| PPE | 60.00 | 20.00 | 45.00 | 60.00 | 20.00 |
| HIPS | 0.00 | 50.00 | 35.00 | 0.00 | 50.00 |
| xPS | 0.00 | 0.00 | 0.00 | 0.00 | 0.00 |
| SBS | 0.00 | 0.00 | 0.00 | 0.00 | 0.00 |
| PP pellets | 42.00 | 22.00 | 22.00 | 36.00 | 22.00 |
| EPR | 0.00 | 0.00 | 0.00 | 6.00 | 0.00 |
| Glass Fibers-14 | 0.00 | 0.00 | 0.00 | 0.00 | 0.00 |
| PROPERTIES | | | | | |
| Flexural Modulus (psi), mean | 295,000 | 305,500 | 313,100 | 257,100 | 299,600 |
| Flex Modulus (psi), stddev | 2,825 | 3,501 | 6,527 | 4,623 | 2,761 |
| Flex Modulus, rel. stddev (%) | 0.96 | 1.15 | 2.08 | 1.80 | 0.92 |
| HDT, 66 psi (° F.) | 329.7 | 237.5 | 287.3 | 303.8 | 233.1 |
| HDT, 264 psi (° F.) | 255.8 | 195.7 | 240.7 | 218.3 | 194.2 |
| Impact Izod Notched (ft-lb/in), mean | 0.4 | 0.3 | 0.4 | 0.3 | 0.4 |
| Impact Izod Notched (ft-lb/in), stddev | 0.1 | 0 | 0 | 0.2 | 0 |
| Impact Izod Notched, rel. stddev (%) | 25 | 0 | 0 | 66.7 | 0 |
| Tensile Elongation at Break (%) | 8.7 | 6.3 | 5.2 | 4.6 | 6.4 |

| | Comp. Ex. 6 | Comp. Ex. 7 | Comp. Ex. 8 | Comp. Ex. 9 | Comp. Ex. 10 |
|---|---|---|---|---|---|
| COMPOSITION | | | | | |
| PP-g-PS | 0.00 | 0.00 | 0.00 | 10.00 | 5.00 |
| hi-S SEBS | 0.00 | 0.00 | 0.00 | 0.00 | 0.00 |
| lo-S SEBS | 0.00 | 0.00 | 0.00 | 0.00 | 0.00 |
| PPE | 45.00 | 10.00 | 30.00 | 10.00 | 60.00 |
| HIPS | 35.00 | 35.00 | 0.00 | 50.00 | 15.00 |
| xPS | 0.00 | 0.00 | 0.00 | 0.00 | 0.00 |
| SBS | 0.00 | 0.00 | 0.00 | 0.00 | 0.00 |
| PP pellets | 22.00 | 57.00 | 72.00 | 32.00 | 22.00 |

TABLE 2-continued

| | | | | | |
|---|---|---|---|---|---|
| EPR | 0.00 | 0.00 | 0.00 | 0.00 | 0.00 |
| Glass Fibers-14 | 0.00 | 0.00 | 0.00 | 0.00 | 0.00 |
| PROPERTIES | | | | | |
| Flexural Modulus (psi), mean | 317,200 | 230,000 | 229,400 | 284,900 | 335,400 |
| Flex Modulus (psi), stddev | 5,014 | 2,181 | 7,107 | 835 | 1,999 |
| Flex Modulus, rel. stddev (%) | 1.58 | 0.95 | 3.10 | 0.29 | 0.60 |
| HDT, 66 psi (° F.) | 284.2 | 216.8 | 252.6 | 215.3 | 324.0 |
| HDT, 264 psi (° F.) | 241.0 | 168.3 | 154.7 | 178.3 | 271.3 |
| Impact Izod Notched (ft-lb/in), mean | 0.5 | 0.5 | 0.5 | 0.4 | 0.4 |
| Impact Izod Notched (ft-lb/in), stddev | 0 | 0 | 0 | 0 | 0 |
| Impact Izod Notched, rel. stddev (%) | 0 | 0 | 0 | 0 | 0 |
| Tensile Elongation at Break (%) | 5.5 | 13.6 | 7.3 | 9.3 | 6.2 |

EXAMPLES 5–9

These examples provide additional illustration of the excellent property balance provided by the composition. Samples were prepared and tested as described for Examples 1–4, above. Compositions and properties are given in Table 3, below.

TABLE 3

| | Ex. 5 | Ex. 6 | Ex. 7 |
|---|---|---|---|
| COMPOSITION | | | |
| PPE | 15.00 | 15.00 | 15.00 |
| xPS | 3.75 | 3.75 | 19.43 |
| SBS | 9.25 | 9.25 | 15.00 |
| SEBS H1043 | 10.00 | 10.00 | 10.00 |
| PP, PD403 | 42.50 | 42.50 | 20.00 |
| EPR | 7.50 | 7.50 | 8.57 |
| PP-g-MA | 2.00 | 2.00 | 2.00 |
| Glass Fibers-14 | 10.00 | 10.00 | 10.00 |
| PROPERTIES | | | |
| Flexural Modulus, 23° C., ⅛" (psi) | 314,800 | 315,600 | 321,300 |
| Flexural Strength at Yield, 23° C., ⅛" (psi) | 10,310 | 10,270 | 10,140 |
| HDT, 66 psi, ⅛" (° F.) | 294.1 | 291.7 | 258.9 |
| HDT, 264 psi, ⅛" (° F.) | 224.4 | 228.1 | 218.1 |
| Notched Izod, 23° C. (ft-lb/in) | 3.7 | 3.8 | 4.1 |
| Notched Izod, −30° C. (ft-lb/in) | 2.2 | 2.3 | 3.1 |
| Unnotched Izod, 23° C. (ft-lb/in) | 11.5 | 11.2 | 11.9 |
| Energy to Maximum Load, 23° C., 7.5 mph (ft-lb) | 8.50 | 8.58 | 8.91 |
| Tensile Strength at Break, 23° C. (psi) | 6,162 | 6,480 | 6,293 |
| Tensile Elongation at Break, 23° C. (%) | 11.47 | 10.53 | 11.40 |

| | Ex. 8 | Ex. 9 |
|---|---|---|
| COMPOSITION | | |
| PPE | 15.00 | 15.00 |
| xPS | 3.75 | 19.43 |
| SBS | 15.00 | 15.00 |
| SEBS H1043 | 10.00 | 10.00 |
| PP, PD403 | 44.25 | 20.00 |
| EPR | 0.00 | 8.57 |
| PP-g-MA | 2.00 | 2.00 |
| Glass Fibers-14 | 10.00 | 10.00 |

TABLE 3-continued

| PROPERTIES | | |
|---|---|---|
| Flexural Modulus, 23° C., ⅛" (psi) | 323,100 | 333,900 |
| Flexural Strength at Yield, 23° C., ⅛" (psi) | 10,510 | 10,260 |
| HDT, 66 psi, ⅛" (° F.) | 291.8 | 258.8 |
| HDT, 264 psi, ⅛" (° F.) | 228.6 | 218.1 |
| Notched Izod, 23° C. (ft-lb/in) | 3.8 | 4.5 |
| Notched Izod, −30° C. (ft-lb/in) | 2.3 | 2.9 |
| Unnotched Izod, 23° C. (ft-lb/in) | 11.7 | 13.0 |
| Energy to Maximum Load, 23° C., 7.5 mph (ft-lb) | 9.05 | 8.64 |
| Tensile Strength at Break, 23° C. (psi) | 6,431 | 6,213 |
| Tensile Elongation at Break, 23° C. (%) | 10.38 | 12.42 |

EXAMPLES 10–15

Comparative Examples 11–16

These examples and comparative examples illustrate the advantages associated with the presence of an unhydrogenated block copolymer in the composition and further illustrate compositions comprising a non-fibrous reinforcing filler. Components are the same as those described in Table 1, except that the poly(arylene ether) (PPE) had an intrinsic viscosity of 0.46 dL/g as measured at 25° C. in chloroform. "Additives" refers to a 1:1:3 weight ratio blend of magnesium oxide, zinc sulfide, and tridodecyl phosphite. Samples were prepared and tested as described for Examples 1–4, above. Compositions and properties are given in Table 4, below. Pair-wise comparisons of samples with and without the unhydrogenated block copolymer SBS show that its presence is generally associated with higher notched Izod impact strength at 23° C. and −30° C., higher energy to maximum load at −30° C., and higher energy to failure at −30° C. Pair-wise comparisons of Exs. 10 and 11, and of Exs. 12 and 13 show that the presence of the ethylene-alpha olefin copolymer EBR is associated with improved notched Izod impact strength at 23° C. and −30° C.

TABLE 4

| | C. Ex. 11 | Ex. 10 | C. Ex. 12 | Ex. 11 |
|---|---|---|---|---|
| COMPOSITION | | | | |
| PP, PD403 | 45.00 | 40.00 | 40.00 | 35.00 |
| EBR | 0.00 | 0.00 | 5.00 | 5.00 |
| SBS | 0.00 | 5.00 | 0.00 | 5.00 |
| SEBS H1043 | 8.00 | 8.00 | 8.00 | 8.00 |
| xPS | 12.00 | 12.00 | 12.00 | 12.00 |
| PP-g-MA | 2.00 | 2.00 | 2.00 | 2.00 |
| glass fibers-14 | 15.00 | 15.00 | 15.00 | 15.00 |
| talc | 0.00 | 0.00 | 0.00 | 0.00 |
| PPE 0.46 IV | 18.00 | 18.00 | 18.00 | 18.00 |
| Additives | 0.25 | 0.25 | 0.25 | 0.25 |
| PROPERTIES | | | | |
| Flexural Modulus, 23° C., ⅛" (psi) | 500,900 | 470,000 | 435,600 | 449,700 |
| std. dev. | 41,690 | 7,236 | 6,499 | 6,493 |
| Flexural Strength at Yield, 23° C., ⅛" (psi) | 15,410 | 14,670 | 13,930 | 13,930 |
| std. dev. | 607 | 103 | 141 | 123 |
| HDT, 264 psi, ⅛" (° F.) | 252.2 | 251.1 | 239.3 | 249.9 |
| std. dev. | 4.2 | 2.0 | 3.5 | 0.8 |
| HDT, 66 psi, ⅛" (° F.) | 300.0 | 299.4 | 295.7 | 295.4 |
| std. dev. | 4.2 | 1.2 | 1.0 | 0.4 |
| Notched Izod, 23° C. (ft-lb/in) | 2.1 | 2.3 | 2.7 | 2.9 |
| std. dev. | 0.1 | 0.1 | 0.1 | 0.1 |

TABLE 4-continued

| | | | | |
|---|---|---|---|---|
| Notched Izod, −30° C. (ft-lb/in) | 1.2 | 1.4 | 1.4 | 1.8 |
| std. dev. | 0.1 | 0.0 | 0.1 | 0 |
| Energy to Maximum Load, 23° C., 7.5 mph (ft-lb) | 3.03 | 3.30 | 3.08 | 2.96 |
| std. dev. | 1.03 | 1.66 | 0.91 | 0.27 |
| Energy to Failure, 23° C., 7.5 mph (ft-lb) | 8.77 | 9.66 | 10.29 | 9.96 |
| std. dev. | 2.79 | 0.53 | 0.54 | 0.39 |
| Energy to Maximum Load, −30° C., 7.5 mph (ft-lb) | 4.49 | 4.65 | 5.69 | 5.40 |
| std. dev. | 2.78 | 2.04 | 2.44 | 1.38 |
| Energy to Failure, −30° C., 7.5 mph (ft-lb) | 7.82 | 8.79 | 10.71 | 12.76 |
| std. dev. | 3.94 | 3.45 | 2.09 | 0.68 |
| Energy to Maximum Load, −30° C., 5 mph (ft-lb) | 0.52 | 0.71 | 0.71 | 1.12 |
| std. dev. | 0.08 | 0.41 | 0.27 | 0.43 |
| Energy to Failure, −30° C., 5 mph (ft-lb) | 0.57 | 0.85 | 0.83 | 2.14 |
| std. dev. | 0.08 | 0.50 | 0.30 | 0.57 |
| Tensile Strength at Yield, 23° C. (psi) | 10,051 | 9,959 | 9,564 | 9,482 |
| std. dev. | 42.6 | 51.7 | 40.3 | 49.6 |
| Tensile Strength at Break, 23° C. (psi) | 10,036 | 9,942 | 9,527 | 9,465 |
| std. dev. | 39 | 58 | 48 | 46 |
| Tensile Elongation at Break, 23° C. (%) | 9.35 | 9.08 | 10.36 | 9.57 |
| std. dev. | 0.16 | 0.14 | 0.25 | 0.13 |

| | C. Ex. 13 | Ex. 12 | C. Ex. 14 | Ex. 13 |
|---|---|---|---|---|
| COMPOSITION | | | | |
| PP, PD403 | 30.00 | 30.00 | 25.5 | 25.5 |
| EBR | 0.00 | 0.00 | 4.50 | 4.50 |
| SBS | 0.00 | 4.50 | 0.00 | 4.50 |
| SEBS H1043 | 6.00 | 6.00 | 6.00 | 6.00 |
| xPS | 16.00 | 11.50 | 16.00 | 11.50 |
| PP-g-MA | 2.00 | 2.00 | 2.00 | 2.00 |
| glass fibers-14 | 30.00 | 30.00 | 30.00 | 30.00 |
| talc | 0.00 | 0.00 | 0.00 | 0.00 |
| PPE 0.46 IV | 16.00 | 16.00 | 16.00 | 16.00 |
| Additives | 0.25 | 0.25 | 0.25 | 0.25 |
| PROPERTIES | | | | |
| Flexural Modulus, 23° C., ⅛" (psi) | 776,200 | 866,900 | 766,100 | 756,600 |
| std. dev. | 98,800 | 18,590 | 24,140 | 17,350 |
| Flexural Strength at Yield, 23° C., ⅛" (psi) | 20,050 | 20,170 | 19,130 | 18,500 |
| std. dev. | 1,313 | 343 | 245 | 281 |
| HDT, 264 psi, ⅛" (° F.) | 274.2 | 278.3 | 263.1 | 266.5 |
| std. dev. | 0.6 | 1.9 | 1.0 | 1.6 |
| HDT, 66 psi, ⅛" (° F.) | 302.7 | 306.1 | 294.7 | 300.2 |
| std. dev. | 0.8 | 0.7 | 0.6 | 1.4 |
| Notched Izod, 23° C. (ft-lb/in) | 2.1 | 2.2 | 2.6 | 2.9 |
| std. dev. | 0.0 | 0.1 | 0.1 | 0.1 |
| Notched Izod, −30° C. (ft-lb/in) | 1.6 | 1.7 | 1.9 | 2.1 |
| std. dev. | 0.1 | 0.1 | 0.1 | 0.1 |
| Energy to Maximum Load, 23° C., 7.5 mph (ft-lb) | 4.51 | 2.66 | 3.78 | 3.23 |
| std. dev. | 1.73 | 0.22 | 1.90 | 0.35 |
| Energy to Failure, 23° C., 7.5 mph (ft-lb) | 12.05 | 12.04 | 12.13 | 11.49 |
| std. dev. | 0.54 | 0.59 | 0.90 | 0.53 |
| Energy to Maximum Load, −30° C., 7.5 mph (ft/lb) | 6.68 | 5.29 | 5.13 | 5.51 |
| std. dev. | 1.13 | 3.12 | 2.53 | 2.55 |
| Energy to Failure, −30° C., 7.5 mph (ft-lb) | 10.75 | 10.95 | 12.53 | 13.72 |
| std. dev. | 2.30 | 1.77 | 2.09 | 2.05 |
| Energy to Maximum Load, −30° C., 5 mph (ft-lb) | 1.15 | 1.19 | 1.61 | 1.95 |
| std. dev. | 0.55 | 0.30 | 0.28 | 0.30 |
| Energy to Failure, −30° C., 5 mph (ft-lb) | 3.00 | 2.63 | 3.04 | 3.53 |
| std. dev. | 0.61 | 0.50 | 0.37 | 0.70 |
| Tensile Strength at Yield, 23° C. (psi) | 14,548 | 13,876 | 13,786 | 13,019 |
| std. dev. | 43.3 | 73.6 | 98.9 | 102.0 |
| Tensile Strength at Break, 23° C. (psi) | 14,548 | 13,876 | 13,786 | 13,019 |
| std. dev. | 43.4 | 73.4 | 98.9 | 102.0 |
| Tensile Elongation at Break, 23° C. (%) | 6.73 | 6.71 | 7.46 | 7.32 |
| std. dev. | 0.10 | 0.09 | 0.05 | 0.11 |

| | C. Ex. 15 | Ex. 14 | C. Ex. 16 | Ex. 15 |
|---|---|---|---|---|
| COMPOSITION | | | | |
| PP, PD403 | 42.00 | 42.00 | 39.00 | 39.00 |
| EBR | 0.00 | 0.00 | 3.00 | 3.00 |
| SBS | 0.00 | 3.00 | 0.00 | 3.00 |
| SEBS H1043 | 6.00 | 6.00 | 6.00 | 6.00 |
| xPS | 12.00 | 9.00 | 12.00 | 9.00 |
| PP-g-MA | 2.00 | 2.00 | 2.00 | 2.00 |
| glass fibers-14 | 0.00 | 0.00 | 0.00 | 0.00 |
| talc | 20.00 | 20.00 | 20.00 | 20.00 |
| PPE 0.46 IV | 18.00 | 18.00 | 18.00 | 18.00 |
| Additives | 0.25 | 0.25 | 0.25 | 0.25 |
| PROPERTIES | | | | |
| Flexural Modulus, 23° C., ⅛" (psi) | 359,800 | 348,200 | 337,300 | 338,200 |
| std. dev. | 14,850 | 2,787 | 4,600 | 2,071 |
| Flexural Strength at Yield, 23° C., ⅛" (psi) | 9,979 | 9,449 | 9,324 | 8,978 |
| std. dev. | 35 | 45 | 45 | 100 |
| HDT, 264 psi, ⅛" (° F.) | 189.5 | 187.3 | 188.4 | 181.3 |
| std. dev. | 4.3 | 2.4 | 0.2 | 1.4 |
| HDT, 66 psi, ⅛" (° F.) | 273.0 | 266.6 | 267.5 | 263.1 |
| std. dev. | 5.8 | 2.4 | 2.7 | 1.2 |
| Notched Izod, 23° C. (ft-lb/in) | 1.0 | 1.1 | 1.2 | 1.4 |
| std. dev. | 0.1 | 0.1 | 0.1 | 0.0 |
| Notched Izod, −30° C. (ft-lb/in) | 0.5 | 0.6 | 0.7 | 0.8 |
| std. dev. | 0.0 | 0.0 | 0.1 | 0.1 |
| Energy to Maximum Load, 23° C., 7.5 mph (ft-lb) | 4.38 | 5.65 | 5.49 | 15.48 |
| std. dev. | 1.98 | 1.74 | 3.70 | 3.12 |
| Energy to Failure, 23° C., 7.5 mph (ft-lb) | 4.66 | 6.47 | 5.83 | 16.53 |
| std. dev. | 2.05 | 1.69 | 3.79 | 4.17 |
| Energy to Maximum Load, −30° C., 7.5 mph (ft-lb) | 1.25 | 1.44 | 2.25 | 4.4 |
| std. dev. | 2.00 | 0.31 | 1.52 | 1.06 |
| Energy to Failure, −30° C., 7.5 mph (ft-lb) | 1.37 | 1.57 | 2.42 | 4.69 |
| std. dev. | 0.21 | 0.32 | 1.59 | 1.11 |
| Energy to Maximum Load, −30° C., 5 mph (ft-lb) | 0.59 | 1.47 | 0.78 | 2.53 |
| std. dev. | 0.13 | 0.53 | 0.19 | 1.03 |
| Energy to Failure, −30° C., 5 mph (ft-lb) | 0.67 | 1.57 | 0.86 | 2.66 |
| std. dev. | 0.12 | 0.55 | 0.22 | 1.05 |
| Tensile Strength at Yield, 23° C. (psi) | 6,416 | 5,987 | 5,950 | 5,617 |
| std. dev. | 18.5 | 20.2 | 8.5 | 48.6 |
| Tensile Strength at Break, 23° C. (psi) | 5,764 | 5,298 | 5,460 | 4,926 |
| std. dev. | 187.5 | 34.6 | 123.8 | 143.6 |
| Tensile Elongation at Break, 23° C. (%) | 38.34 | 48.77 | 41.50 | 56.66 |
| std. dev. | 7.59 | 1.05 | 5.78 | 9.57 |

EXAMPLES 16 and 17

These examples further illustrate the advantages associated with compositions comprising a polystyrene-graft-cyclic anhydride copolymer, even when the compositions contain no unhydrogenated block copolymer. Components are the same as those described in Table 1, except that the poly(arylene ether) (PPE) had an intrinsic viscosity of 0.46 dL/g as measured at 25° C. in chloroform. "Additives" refers to a 1:1:3 weight ratio blend of magnesium oxide, zinc sulfide, and tridodecyl phosphite. Samples were prepared and tested as described for Examples 1–4, above. Compositions and properties are given in Table 5, below.

TABLE 5

|  | Ex. 16 | Ex. 17 |
| --- | --- | --- |
| COMPOSITION |  |  |
| PP, PD403 | 15.72 | 16.31 |
| PP-EPR, HECO-30 | 21.70 | 8.85 |
| SEBS H1043 | 9.98 | 4.99 |
| xPS | 4.14 | 8.34 |
| PP-g-MA | 2.00 | 2.00 |
| glass fibers-14 | 31.26 | 39.92 |
| PPE 0.46 IV | 14.96 | 19.36 |
| Additives | 0.25 | 0.25 |
| PROPERTIES |  |  |
| Flexural Modulus, 23° C., 1/8" (psi) | 843,400 | 1,212,000 |
| std. dev. | 19,630 | 15,010 |
| Flexural Strength at Yield, 23° C., 1/8" (psi) | 20,080 | 23,130 |
| std. dev. | 118 | 201 |
| HDT, 264 psi, 1/8" (° F.) | 292 | 294.4 |
| std. dev. | 7.0 | 1.3 |
| HDT, 66 psi, 1/8" (° F.) | 313.9 | 315.7 |
| std. dev. | 0.3 | 0.1 |
| Notched Izod, 23° C. (ft-lb/in) | 2.9 | 2.0 |
| std. dev. | 0.1 | 0.1 |
| Notched Izod, −30° C. (ft-lb/in) | 1.8 | 1.5 |
| std. dev. | 0.1 | <0.05 |
| Energy to Maximum Load, 23° C., 7.5 mph (ft-lb) | 4.96 | 7.53 |
| std. dev | 2.45 | 1.12 |
| Energy to Maximum Load, −30° C., 7.5 mph (ft-lb) | 6.65 | 6.19 |
| std. dev. | 2.65 | 2.24 |
| Total Energy, 23° C., 7.5 mph (ft-lb) | 13.6 | 12.6 |
| std. dev. | 0.6 | 1.1 |
| Total Energy, −30° C., 7.5 mph (ft-lb) | 6.6 | 6.16 |
| std. dev. | 2.65 | 2.24 |
| Tensile Strength at Yield, 23° C. (psi) | 12,781 | 14,830 |
| std. dev. | 130 | 150 |
| Tensile Strength at Break, 23° C. (psi) | 12,780 | 14,830 |
| std. dev. | 130.5 | 153.9 |
| Tensile Elongation at Break, 23° C. (%) | 7.32 | 5.79 |
| std. dev. | 0.21 | 0.16 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A thermoplastic composition, comprising:
   a poly(arylene ether);
   a poly(alkenyl aromatic) resin in an amount of at least about 10 weight percent of the total of the poly(arylene ether) and the poly(alkenyl aromatic) resin;
   a polyolefin;
   a hydrogenated block copolymer of an alkenyl aromatic compound and a conjugated diene, wherein the hydrogenated block copolymer has an alkenyl aromatic content of 40 to about 90 weight percent;
   a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof; and
   a reinforcing filler comprising glass fibers.

2. The thermoplastic composition of claim 1, wherein the poly(arylene) ether) comprises a plurality of structural units of the formula

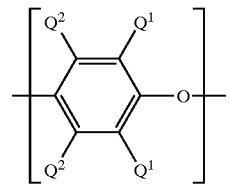

wherein for each structural unit, $Q^1$ is independently halogen, primary or secondary $C_1$–$C_8$ alkyl, phenyl, $C_1$–$C_8$ aminoalkyl, $C_1$–$C_8$ hydrocarbonoxy, or $C_2$–$C_8$ halohydrocarbonxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ aminoalkyl, $C_1$–$C_8$ hydrocarbonxy, or $C_2$–$C_8$ halohydrocarbonoxy wherein at least two carbon atoms separate the halogen and oxygen atoms.

3. The thermoplastic composition of claim 2, wherein each $Q^1$ is independently $C_1$–$C_4$ alkyl or phenyl, and each $Q^2$ is independently hydrogen or methyl.

4. The thermoplastic composition of claim 1, wherein the poly(arylene ether) is a copolymer of 2,6-dimethylphenol and 2,3,6-trimethylphenol.

5. The thermoplastic composition of claim 1, wherein the poly(arylene ether) is present at about 10 weight percent to about 55 weight percent, based on the total weight of the composition.

6. The thermoplastic composition of claim 1, wherein the poly(alkenyl aromatic) resin comprises at least 25% by weight of structural units derived from an alkenyl aromatic monomer of the formula

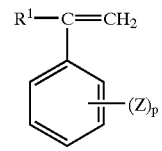

wherein $R^1$ is hydrogen, $C_1$–$C_8$ alkyl, or halogen; Z is vinyl, halogen, or $C_1$–$C_8$ alkyl; and p is 0 to 5.

7. The thermoplastic composition of claim 6, wherein the poly(alkenyl aromatic) resin comprises at least one poly(alkenyl aromatic) resin selected from the group consisting of atactic homopolystyrene, syndiotactic homopolystyrene, rubber-modified polystyrene, and mixtures comprising at least one of the foregoing poly(alkenyl aromatic) resins.

8. The thermoplastic composition of claim 1, wherein the poly(alkenyl aromatic) resin is present at about 1 weight percent to about 50 weight percent, based on the total weight of the composition.

9. The thermoplastic composition of claim 1, wherein the polyolefin is a propylene polymer; wherein the propylene polymer is a homopolymer of polypropylene, or a random, graft, or block copolymer of propylene and at least one olefin selected from ethylene and $C_4$–$C_{10}$ alpha-olefins, with the proviso that the copolymer comprises at least about 80 weight percent of repeating units derived from propylene.

10. The thermoplastic composition of claim 1, wherein the polyolefin comprises a homopolypropylene.

11. The thermoplastic composition of claim 1, wherein the polyolefin is present at about 10 weight percent to about 60 weight percent, based on the total weight of the composition.

12. The thermoplastic composition of claim 1, wherein the hydrogenated block copolymer comprises:

(A) at least one block derived from an alkenyl aromatic compound having the formula

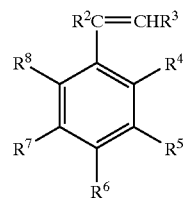

wherein $R^2$ and $R^3$ each represent a hydrogen atom, a $C_1$–$C_8$ alkyl group, or a $C_2$–$C_8$ alkenyl group; $R^4$ and $R^8$ each represent a hydrogen atom, a $C_1$–$C_8$ alkyl group, a chlorine atom, or a bromine atom; and $R^5$–$R^7$ each independently represent a hydrogen atom, a $C_1$-$C_8$ alkyl group, or a $C_2$–$C_8$ alkenyl group, or $R^4$ and $R^5$ are taken together with the central aromatic ring to form a naphthyl group, or $R^5$ and $R^6$ are taken together with the central aromatic ring to form a naphthyl group; and (B) at least one block derived from a conjugated diene, in which the aliphatic unsaturated group content in the block (B) is reduced by hydrogenation.

13. The thermoplastic composition of claim 1, wherein the hydrogenated block copolymer comprises a styrene-(ethylene-butylene)-styrene triblock copolymer.

14. The thermoplastic composition of claim 1, wherein the hydrogenated block copolymer has a styrene content of about 50 to about 85 weight percent.

15. The thermoplastic composition of claim 1, wherein the hydrogenated block copolymer has a styrene content of about 55 to about 70 weight percent.

16. The thermoplastic composition of claim 1, wherein the hydrogenated block copolymer is present at about 1 weight percent to about 20 weight percent, based on the total weight of the composition.

17. The thermoplastic composition of claim 1, wherein the a polyolefin-graft-cyclic anhydride copolymer is a polypropylene-graft-maleic anhydride copolymer.

18. The thermoplastic composition of claim 1, wherein the a polyolefin-graft-cyclic anhydride copolymer is present at about 0.1 to about 10 weight percent, based on the total weight of the composition.

19. The thermoplastic composition of claim 1, wherein the reinforcing filler further comprises a filler selected from the group consisting of talc, quartz fibers, carbon fibers, potassium titanate fibers, silicon carbide fibers, boron carbide fibers, gypsum fibers, aluminum oxide fibers, iron fibers, nickel fibers, copper fibers, wollastonite fibers, poly (ether ketone) fibers, polyimide benzoxazole fibers, poly (phenylene sulfide) fibers, polyester fibers, aromatic polyamide fibers, aromatic polyimide fibers, aromatic polyetherimide fibers, acrylic fibers, poly(vinyl alcohol) fibers, polytetrafluoroethylene fibers, and combinations comprising at least one of the foregoing reinforcing fillers.

20. The thermoplastic composition of claim 1, wherein the glass fibers have a diameter of about 2 to about 25 micrometers.

21. The thermoplastic composition of claim 1, wherein the reinforcing filler further comprises talc.

22. The thermoplastic composition of claim 1, wherein the reinforcing filler further comprises vapor-grown carbon fibers having an average diameter of about 3 to about 500 nanometers.

23. The thermoplastic composition of claim 1, wherein the reinfoxcing filler comprises a surface coating in an amount effective to increase compatibility with the polyolefin.

24. The thermoplastic composition of claim 1, wherein the reinfoicing filler is present at about 1 weight percent to about 50 weight percent, based on the total weight of the composition.

25. The thermoplastic composition of claim 1, further comprising an unhydrogenated block copolymer of alkenyl aromatic compound and a conjugated diene.

26. The thermoplastic composition of claim 25, wherein the unhydrogenated block copolymer comprises a styrene-butadiene diblock copolymer or a styrene-butadiene-styrene triblock copolymer.

27. The thermoplastic composition of claim 25, wherein the unhydrogenated block copolymer of alkenyl aromatic compound and a conjugated diene is present at about 0.5 weight percent to about 20 weight percent, based on the total weight of the composition.

28. The thermoplastic composition of claim 1, further comprising a polypropylene-polystyrene graft copolymer.

29. The thermoplastic composition of claim 28, wherein the polypropylene-polystyrene graft copolymer comprises a graft copolymer having a propylene polymer backbone and one or more styrene polymer grafts.

30. The thermoplastic composition of claim 28, wherein the polypropylene-polystyrene graft copolymer comprises about 10 to about 90 weight percent propylene polymer backbone and about 90 to about 10 weight percent styrene polymer grafts.

31. The thermoplastic composition of claim 28, wherein the polypropylene-polystyrene graft copolymer is present at about 0.5 weight percent to about 20 weight percent, based on the total weight of the composition.

32. The thermoplastic composition of claim 1, wherein the polyolefin is homopolypropylene, and wherein the composition further comprises an ethylene/alpha-olefin elastomeric copolymer at about 0.5 weight percent to about 25 weight percent, based on the total weight of the composition.

33. The thermoplastic composition of claim 32, wherein the ethylene/alpha-olefin elastomeric copolymer comprises a copolymer of ethylene and at least one $C_3$–$C_{10}$ alpha-olefin.

34. The thermoplastic composition of claim 32, wherein the ethylene/alpha-olefin elastomeric copolymer comprises an ethylene-butylene rubber, an ethylene-propylene rubber, or a mixture thereof.

35. The thermoplastic composition of claim 1, further comprising a hydrogenated block copolymer of an alkenyl aromatic compound and a conjugated diene, wherein the hydrogenated block copolymer has an alkenyl aromatic content of about 10 to less than 40 weight percent.

36. The thermoplastic composition of claim 1, further comprising an additive selected from the group consisting of stabilizers, mold release agents, processing aids, flame retardants, drip retardants, nucleating agents, UV blockers, dyes, pigments, particulate fillers, antioxidants, anti-static agents, blowing agents, and combinations comprising at least one of the foregoing additives.

37. The thermoplastic composition of claim 1, wherein the composition after molding exhibits a flexural modulus at 23° C. according to ASTM D790 greater than about 300 kpsi.

38. The thermoplastic composition of claim 1, wherein the composition after molding exhibits a sample-to-sample variability in Flexural Modulus at 23° C. of less than about 10 percent.

39. A thermoplastic composition, comprising:
a poly(arylene ether);
a poly(alkenyl aromatic) resin;
a polyolefin;
a hydrogenated block copolymer of an alkenyl aromatic compound and a conjugated diene, wherein the hydrogenated block copolymer has an alkenyl aromatic content of about 40 to about 90 weight percent;
a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof;
a polypropylene-polystyrene graft copolymer or an unhydrogenated block copolymer of an alkenyl aromatic compound and a conjugated diene; and
a reinforcing filler comprising glass fibers.

40. A thermoplastic composition, comprising:
about 10 to about 55 weight percent of a poly(arylene ether);
about 1 to about 50 weight percent of a poly(alkenyl aromatic) resin; wherein the amount of poly(alkenyl aromatic) resin is at least about 10 weight percent of the total of the poly(arylene ether) and the poly(alkenyl aromatic) resin;
about 10 to about 60 weight percent of a polyolefin;
about 1 to about 20 weight percent of a hydrogenated block copolymer of alkenyl aromatic compound and a conjugated diene having an alkenyl aromatic content of about 40 to about 90 weight percent;
about 0.1 to about 10 weight percent of a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof; and
about 1 to about 50 weight percent of a reinforcing filler comprising glass fibers;
wherein all weight percents are based on the total weight of the composition.

41. A thermoplastic composition, comprising:
about 10 to about 55 weight percent of a poly(arylene ether);
about 1 to about 50 weight percent of a poly(alkenyl aromatic) resin;
about 10 to about 60 weight percent of a polyolefin;
about 1 to about 20 weight percent of a hydrogenated block copolymer of alkenyl aromatic compound and a conjugated diene having an alkenyl aromatic content of about 40 to about 90 weight percent;
about 0.5 to about 20 weight percent of a polypropylene-polystyrene graft copolymer or an unhydrogenated block copolymer of an alkenyl aromatic compound and a conjugated diene;
about 0.1 to about 10 weight percent of a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof; and
about 1 to about 50 weight percent of a reinforcing filler comprising glass fibers;
wherein all weight percents are based on the total weight of the composition.

42. A thermoplastic composition, comprising:
about 10 to about 55 weight percent of a poly(arylene ether);
about 1 to about 50 weight percent of a poly(alkenyl aromatic) resin;
about 10 to about 60 weight percent of a polyolefin;
about 1 to about 20 weight percent of a hydrogenated block copolymer of alkenyl aromatic compound and a conjugated diene having an alkenyl aromatic content of about 40 to about 90 weight percent;
about 0.1 to about 10 weight percent of a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof;
about 1 to about 50 weight percent of a reinforcing filler comprising glass fibers;
about 0.5 to about 20 weight percent of a polypropylene-polystyrene graft copolymer or an unhydrogenated block copolymer of an alkenyl aromatic compound and a conjugated diene; and
about 0.5 to about 25 weight percent of an ethylene/aipha-olefin elastomeric copolymer;
wherein all weight percents are based on the total weight of the composition.

43. A thermoplastic composition, comprising the reaction product of:
a poly(arylene ether);
a poly(alkenyl aromatic) resin in an amount of at least about 10 weight percent of the total of the poly(arylene ether) and the poly(alkenyl aromatic) resin;
a polyolefin;
a hydrogenated block copolymer of an alkenyl aromatic compound and a conjugated diene, wherein the hydrogenated block copolymer has an alkenyl aromatic content of about 40 to about 90 weight percent;
a polyolefin-graft-cyclic anhydride copolymer a polyolefin-graft-cyclic anhydride copolymer consisting of a polyolefin backbone and polar grafts formed from polymerization of one or more cyclic anhydrides, wherein the polyolefin backbone comprises at least 80 weight percent of units derived from polymerization of ethylene, propylene, butylene, or a mixture thereof; and
a reinforcing filler comprising glass fibers.

44. An article comprising the composition of claim 43.

45. An article comprising the composition of claim 43, wherein the article is formed using at least one method selected from the group consisting of injection molding, blow molding, extrusion, sheet extrusion, film extrusion, profile extrusion, pultrusion, compression molding, thermoforming, pressure forming, hydroforming, and vacuum forming.

46. A sheet comprising the composition of claim 43.

* * * * *